July 10, 1962   F. G. J. GRISE   3,043,566
CONTROL APPARATUS FOR POWER-OPERATED CABLES
Filed Aug. 14, 1958   5 Sheets-Sheet 1

Fig. 1.

Inventor
Frederick G.J. Grise
By *[signature]*
Attorney

July 10, 1962  F. G. J. GRISE  3,043,566
CONTROL APPARATUS FOR POWER-OPERATED CABLES
Filed Aug. 14, 1958  5 Sheets-Sheet 3

INVENTOR
*Frederick G.J. Grise*

BY *George H. Kennedy Jr.*

ATTORNEY

United States Patent Office 3,043,566
Patented July 10, 1962

3,043,566
CONTROL APPARATUS FOR POWER-OPERATED CABLES
Frederick G. J. Grise, New Braintree, Mass., assignor, by direct and mesne assignments, to Lionel Grise, Jr., Ware, Mass.
Filed Aug. 14, 1958, Ser. No. 755,076
20 Claims. (Cl. 254—174)

This invention relates generally to the control of power-operated cables, and more particularly to automatic control apparatus which, when associated with a conventional power-driven cable system, serves to prolong very materially the useful life of the cable or cables used therein.

Pull cables, in association with power driven winches or drums for cable take up and pay out, are very extensively used for positioning and actuating the work-performing elements of heavy-duty earth moving machinery. In this environment, because of sudden shock loads and other severe operating conditions, cable wear is often very rapid and cable breakage very frequent. In the use and operation of certain kinds of earth-moving equipment, the overall cable expense always runs into very large figures. This is because it involves not only the high cost of numerous full length replacement cables, but also, with every such replacement, a very costly "down time" for the entire machine, while performing the laborious and time-consuming tasks of removing the worn or broken cable and installing the new one.

Particularly is this the case with large numbers of cable-operated carry-type earth moving scrapers now in general use. This type of scraper comprises a large bowl or body member having a draft connection by which it is pulled forward by a tractor unit. The bowl's forward edge is lowered into scraping contact with the earth, so as to obtain loading of material into the bowl as the scraper is drawn forward. The rear of the bowl is closed by a movable upright ejector which, after the filled or loaded bowl has been raised and then transported to its destination, must be forcibly pulled or drawn forward to spread the bowl's contents over the desired area. The front of the bowl is equipped with a swingable apron, which, while held partly open during loading of the bowl, must be swung downwardly to closed position during transportation of the load and then raised to open position ahead of the ejector's load discharging movement.

The load carrying bowl member has a pivotal mounting, usually about the axis of the scraper's rear wheels, and its forward end is supported at the required different levels by a cable running to a cable-winding drum on the tractor. The ejector and also the apron are operated by another cable, running to a second cable winding drum on the tractor. Both of these cable winding drums are powered for rotation, usually by a suitable power take-off from the tractor's engine.

In every case it is the task of a single operator, not only to drive and steer the tractor, but also to control, manually and selectively, during the tractor's travel over rough terrain, the operations of both of these cable winding drums, in correct and timely fashion for performance of the scraper's (or other implement's) several functions. For cable drum control purposes, the operator's conventional equipment is a pair of adjacent rockable hand levers, one for each drum. The usual arrangement is such that when either hand lever occupies a neutral or mid position, it applies a suitable brake to the associated cable drum to prevent the drum's rotation in either direction; when the operator rocks said lever in one direction, say counterclockwise, it releases the brake and engages a suitable clutch, to rotate said drum by power, for the reel in or take up of its cable; and when the operator rocks said lever from its mid position in the other direction, it releases the brake to permit free spooling pay out of said drum's cable.

It goes without saying that a "green" or inexperienced operator is always beset with serious difficulties and much confusion, in the selection, management, and manipulation of these two hand levers that are conventionally employed for cable drum control, in tractor drawn scrapers and other similar heavy-duty earth-moving equipment. For such an operator, by his frequent misuse of these hand levers, as well as by his ignorance, at any given instant, of the actual conditions prevailing behind him in the implement's load-carrying body, is certain always, in the nature of things, to subject both of these cables to almost constant abuse and to numerous sudden breakages.

As a matter of fact, the conditions of scraper operation change so rapidly and so violently, that even an experienced operator is frequently not able to cope with them, in such manner as to prevent cable damage and/or breakage. This is because these conventional hand lever systems of cable drum control afford an operator little or no opportunity to counteract, in time to do any good, various hazardous occurrences of (1) cable slackness and (2) cable overload, which are well known to be the two principal causes of cable failure. These are conditions that frequently arise without warning, not only in carry-type cable-operated scrapers, but also in such well-known heavy duty equipment as cable-operated bulldozers. The same is also true of earth-moving implements known as "Movealls," which, in similar fashion to scrapers, employ a cable-operated ejector for the discharge of the implement's load.

Cable slack is a condition that frequently arises from the tendency of any cable drum, when the hand lever of its power control unit is in cable pay out position, to continue to rotate by its own inertia, until the hand lever is returned to its "neutral" or brake applying position. It is often quite difficult for an operator to accomplish this, in time to prevent some excess cable from being payed out by the drum. This excess or slack cable, resulting from overspooling of the drum, tends to form loops or kinks which, upon subsequent reeling in of the cable, set up excessive bending stresses in the cable's wires or strands, with resultant early failure of the cable.

Cable overload can very quickly develop from a variety of conditions. One such condition, for example, is when a cable-operated ejector (of a scraper or of a "Moveall") in its task of discharging the implement's load, suddenly encounters an undue or abnormal resistance to its work-performing movement. In a scraper, this condition often arises from lodgment of a large rock or other obstruction in the space between bowl or apron; in a "Moveall," it often arises from an operator's failure, before engaging the clutch of the cable drum that produces the ejector's load discharging movement, to release the brake of the other cable drum which serves for the ejector's return or reverse movement. In either case, unless the operator is very quick indeed to sense the dangerous condition, he will continue to hold in its clutch-engaging position the hand lever for the ejector's work performing stroke, which of course quickly overloads the cable and causes its breakage.

The primary object of my invention is to eliminate from cable drum control systems their inherent potentialities for cable damage and/or breakage that arise, as above described, from cable slack and cable overload.

To this end my invention provides, preferably as a supplement to or as an attachment for existing power operated cable systems, an apparatus which prevents either of these hazardous conditions (slack in a paying out cable, or overload in a cable being reeled in) from ever developing. That is to say, said apparatus, in response to an undue drop in a paying out cable's load or tension, effectively applies this cable drum's brake by a force of sufficient magnitude to override an operator's maintenance of said drum's hand lever in its cable pay out position. Similarly, said apparatus, in response to an undue rise in a taking up cable's tension, operates promptly and effectively to disengage this cable drum's clutch and to apply its brake, likewise by a force of sufficient magnitude to override an operator's maintenance of said drum's hand lever in its clutch-engaging position. Thus it is that my invention, even when a "green" or inexperienced operator is at the controls, serves effectively to forestall and prevent both cable slack and cable overload, which are the two principal causes of cable failure.

Violent jouncing up and down, from a scraper's (or other implement's) rapid travel over rough terrain, can sometimes cause momentary slackness in a loaded (and normally taut) cable, especially when the latter's drum is held stationary by its brake. The principal hazard in this situation is a tendency for this momentary slackness to so loosen the cable's windings on its drum, that these windings become disarranged and crossed upon each other—this leading to rapid cable wear. My invention, as hereinafter described, incorporates, along with its other features, a means that prevents this momentary cable slackness from working back to that portion of the cable which is wound upon the drum.

Other and further objects and advantages of my invention will become apparent from the following detailed description, taken in connection with the accompanying illustrative drawings. Said drawings show the invention as applied to the conventional power-operated cable systems of a tractor-drawn carry-type earth-moving scraper an environment wherein the invention is particularly useful. It will be apparent, however, that the invention is equally applicable to and useful in a wide variety of other heavy-duty implements wherein similar power-operated cables are subjected to rough usage and heavy strains. In said drawings.

Like reference characters refer to like parts in the different figures.

Figure 1:
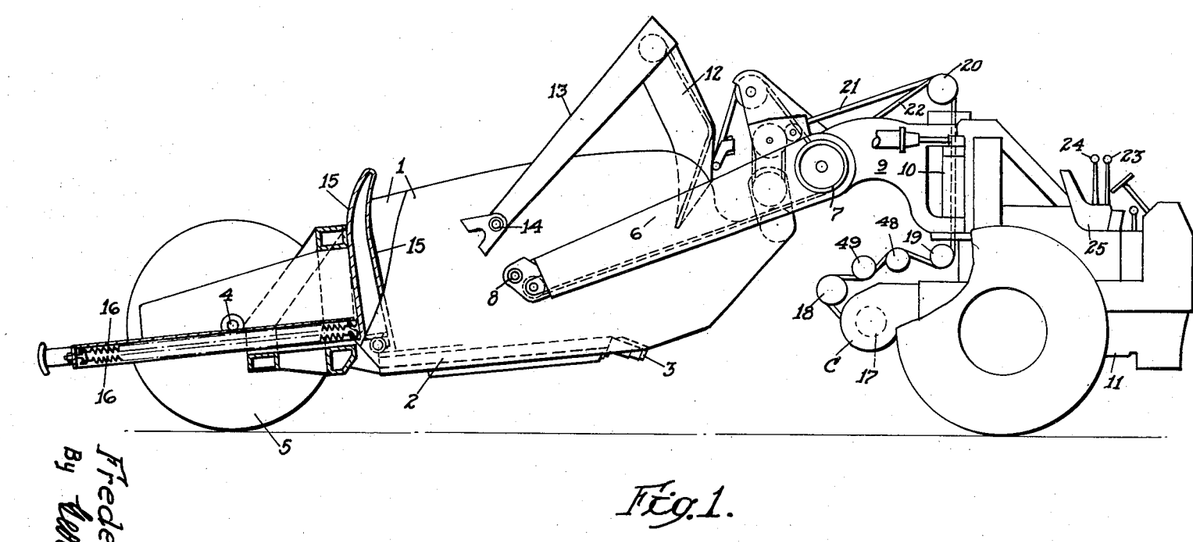
FIG. 1 is a side elevational view, partly in section, of a conventional tractor-drawn cable-operated scraper, and showing, for one of said implement's cables, a pair of movably mounted sheaves, responsive to cable tension, that are provided on the inner side of the automatic control apparatus of my invention.

FIG. 1 shows a tractor-drawn cable-controlled scraper, whose principal elements are of conventional construction and arrangement. That is to say, the scraper body or bowl consists of spaced side plates 1, 1 and a bottom 2. The latter's forward edge provides a scraper blade 3. The rear portion of the bowl has pivotal support about the axle 4 of a pair of spaced ground wheels, one of which is shown at 5. Said bowl's draft connection to the tractor is the usual draft frame, which provides a pair of laterally spaced arms (one shown at 6) that extend rearwardly from a hollow cross member 7, and have alined pivotal connections (one shown at 8) with the side plates 1, 1 of the bowl. Extending forwardly from the center of cross member 7 is the usual "goose-neck" draft arm 9 which is supported at its forward end by a universal hitch 10 on the rear of a wheel type tractor, indicated generally at 11. The several pivotal connections permit the bowl to pivot up or down about the axle 4 of the scraper's support wheels 5, for raising or lowering, as required, the forward end of said bowl.

The scraper bowl has the usual front gate or apron 12 which when lowered to closed position prevents the bowl's contents from spilling. This apron 12 also serves, when partially closed to regulate the amount of earth passing into the bowl over its scraper edge 3 during a scraping operation. The apron 12 is carried by a pair of laterally spaced arms (one shown at 13) which have alined pivotal connections (one shown at 14) with the bowl sides 1, 1. This permits the apron to be swung upwardly to the open position as shown in FIG. 1, or to be lowered to a closed position.

The bowl is equipped with the usual upright ejector member 15, which, substantially as shown and described in Gustafson Patent No. 2,573,765, of November 6, 1951, is supported to move forwardly with relation to the sides 1, 1 and bottom 2 of the bowl, to effect discharge of the latter's contents over the scraper edge 3 when the apron 12 is in raised position. After each such ejection of the bowl's contents, the ejector 15 is returned to its normal position shown in FIG. 1 (where it serves as the bowl's rear wall) by the retractile action of a plurality of powerful springs 16, 16, substantially as shown and described in the aforesaid Gustafson patent.

The rear end of tractor 11 carries a manually-operated two-cable power control unit C of conventional construction, which takes power from a rear power take-off shaft of the tractor. This unit includes a pair of independent, axially-alined cable-winding drums, one of which is indicated in FIG. 1 by the broken lines 17. The function of these two drums is to take in or pay out a pair of cables, for controlling the operation of the scraper. Each cable, from its drum 17, passes around a swivelled cable-laying sheave 18, thence forwardly around a guide sheave 19 and upwardly through the hollow center of the draft connection, and over a guide sheave 20 carried by draft member 9.

From their respective upper guide sheaves 20, both cables extend rearwardly. One such cable, shown at 21 in FIG. 1, serves for scraper bowl operation, being connected to said bowl in any suitable manner, such as that disclosed for the bowl cable (numbered 24') of the aforesaid Gustafson patent. The other cable, designated 22, in FIG. 1 and also in FIG. 2, serves for operation of the scraper's ejector 15 and apron 12, being connected to those parts in any suitable manner, such as that disclosed for the ejector cable (numbered 60) of the aforesaid Gustafson patent. FIG. 1 also shows the usual rockable three-position hand lever 23, for controlling the operations of the drum which carries bowl cable 21, and the adjacent companion hand lever 24 for identical (and independent) control of the drum 17 whereon is wound the ejector-and-apron cable 22. These two hand levers 23 and 24 are positioned near the tractor seat 25, in convenient reach of an operator's right hand.

Figures 2, 6:
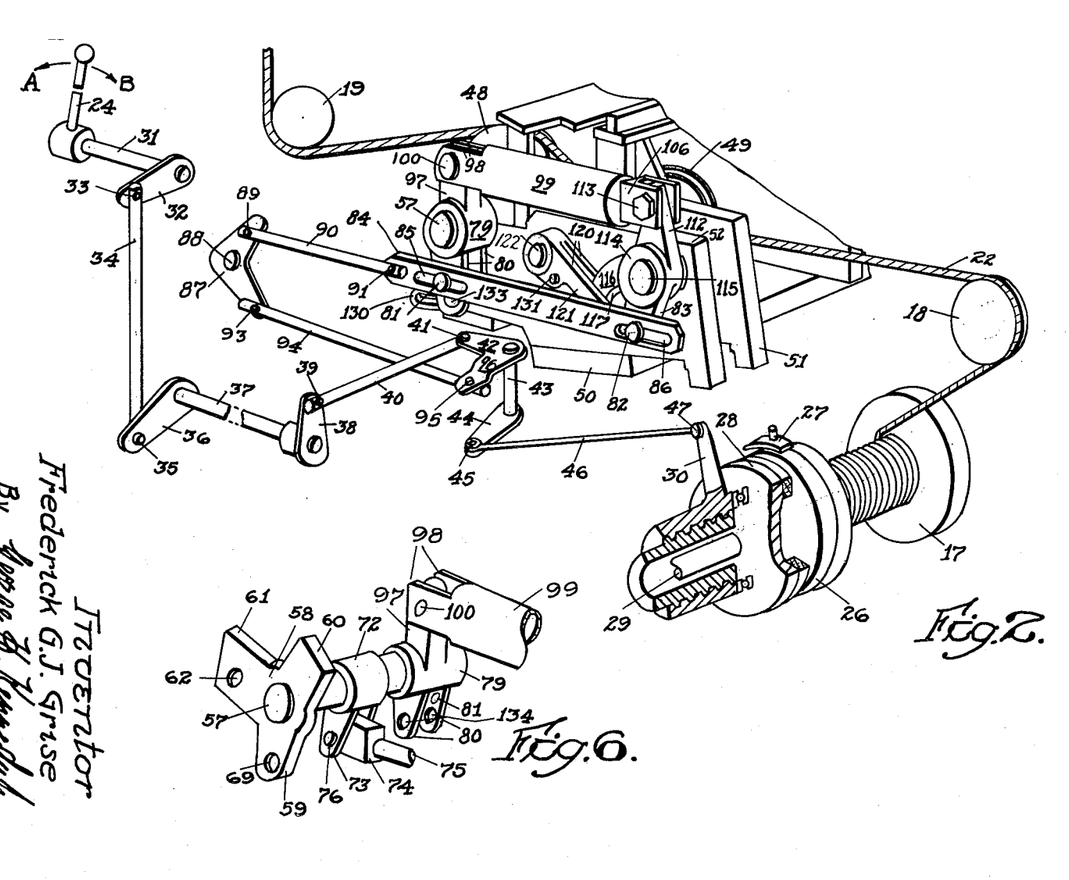
FIG. 2 is a large scale perspective view of said control apparatus from its outer side, and showing schematically its relation to and connection with one of said implement's existing manually-operated cable drum control units, the latter, for simplicity, being shown symbolically.
FIG. 6 is a detached perspective view of a multi-arm rock shaft, that carries one of the tension responsive movable sheaves of said apparatus.

FIG. 2 shows symbolically for ejector cable drum 17 the various existing elements for its control, these of course being duplicated for the other cable drum, not shown, and its hand lever 23, of this conventional two-cable control unit C. Such control elements, for selectively braking, clutching, or releasing each cable drum, may be of any known construction and arrangement, such, for example, as that shown and described in Bridwell Patent No. 2,596,203, dated May 13, 1952. The essential control elements for each cable drum 17 comprise (see FIG. 2) an attached brake drum 26, a brake band 27, a clutch 28 engageable to drive both drums from a rotating shaft or drive member 29, and a single rockably-mounted control lever 30, corresponding to the control lever numbered 25 in the aforesaid Bridwell patent.

FIG. 2 also shows a set of connections which is typical of the connections usually existing between each drum control lever 30 and the operator's hand lever (23 or 24) by which said control lever is moved. These connections, shown here only for hand lever 24, are also provided for the hand lever 23 of the other drum of unit C. Said connections include a suitably supported horizontal rock shaft 31 to which the hand lever (24 in FIG. 2) is secured, said rock shaft having an arm 32 to which is pivoted at 33 a depending link or rod 34. The latter's lower end is pivotally connected at 35 to an arm 36 extending from an elongated substantially horizontal rock shaft 37. The latter's rear end carries an arm 38, to which is pivotally connected at 39, a transverse link or rod 40 whose inner end has pivotal connection at 41 with an arm 42 extending forwardly from a suitably supported vertical rock shaft 43. The latter's other end carries an outwardly extending arm 44 to which is pivotally connected at 45, a rod or link 46 whose other end has pivotal connection at 47 with the aforesaid control lever 30 of the illustrated cable drum 17.

In the illustrated substantially upright or mid position of either hand lever (23 or 24) the above described existing connections with its drum's control lever 30 dispose the latter, as shown, in a substantially vertical position. In this position, with clutch 28 disengaged, the brake band 27 is drawn tight on drum 26, to hold the cable drum 17 against rotation. When the operator pulls the hand lever (24 in FIG. 2) inwardly, in the direction indicated by arrow A, these existing connections rock the associated control lever 30 rearwardly, to a position which releases brake band 27 and engages the clutch 28, so as to rotate drum 17 for take up of its cable. When the operator pushes either hand lever from its mid or brake applying position in the direction indicated by arrow B, these existing connections rock the control lever 30 forwardly, to a position which releases the brake band 27, and permits free spooling payout of cable from the drum 17.

The mechanism as thus far described, which is typical of existing systems of cable drum control, gives rise in ordinary operation, to frequent occurrences of cable slack and cable overload, all as fully pointed out in the introductory paragraphs hereof. My invention secures complete elimination of these cable damaging and cable breaking conditions, by supplementary automatic control apparatus, which, as depicted in FIG. 2, can readily and very advantageously be applied to and superimposed upon an ordinary existing cable drum control system, without any change or alteration of such system's significant parts.

Significant elements of my control apparatus, as hereinafter described in detail, are a pair of spaced movably-mounted sheaves 48 and 49, which are engaged from opposite sides by a live or active reach of the power-operated cable to which the apparatus is applied. Although my invention is applicable to any such live or active cable reach, it is here shown as applied to that reach of each of the cables 21 and 22 of FIG. 1, which extends from the cable-laying sheave 18 to the guide sheave 19 for each such cable. This particular live reach of each cable is utilized, primarily because of its convenient proximity to the two-cable drum control unit C, and to the latter's existing connections, as above described, that run to the operator's hand levers 23 and 24. FIG. 2 shows my control apparatus only for the ejector cable 22; it will be understood however that for the adjacent and parallel live reach of bowl cable 21, a duplicate control apparatus (not shown) is provided, having its cable-contacting sheaves (not shown) on the inner side thereof, in close proximity and directly opposed relation to the sheaves 48 and 49 that engage the ejector cable 22.

My control apparatus in its here illustrated embodiment, provides a suitable generally horizontal base 50, which, if desired, may be common to both of the above-described duplicate mechanisms, only one of which (the one for the cable 22) is here shown. The under surface of base 50 is appropriately shaped and recessed to seat firmly on the tractor's underlying housing elements, at and adjacent to the conventional hand-operated power control unit C, and is securely attached to said housing elements in any suitable way. From said base's upper surface, for each automatic control apparatus of my invention rises a pair of parallel spaced apart inner and outer uprights 51 and 52 respectively, these being connected near one end of said base, by a transverse web 53, which is centrally apertured, as shown at 54, FIG. 3, for a purpose to be hereinafter described. At their other ends, the uprights 51 and 52 have alined concave recesses 55, 55, surmounted by suitable bearing caps 56, 56, to provide inner and outer journals for a transverse rock shaft 57, whose opposite ends extend well beyond the respective inner and outer uprights 51 and 52.

Said rock shaft 57 is of the multi-armed construction best shown by FIG. 6. To its inner end is suitably secured a three-armed member 58, the latter providing, as shown, a lower arm 59, an upper arm 60, and a forward arm 61. Arm 61 is apertured at 62, to receive a pin 63, projecting from said arm's inner face, and having mounted thereon for free rotative movement, the sheave 48, over which is adapted to be trained (see FIGS. 1 and 2) the aforesaid live or active reach of cable 22.

The mounting for the companion sheave 49 (beneath which said active cable reach is trained) is provided by a movable plate 64. The latter's construction, and also its relation to the three armed member 58, is best revealed by FIG. 7. Said plate 64 occupies the same vertical plane as said member 58, being maintained in this upright position by its lower and upper bifurcated extensions 65 and 66 respectively, the former spanning the lower arm 59, and the latter spanning the upper arm 60 of said member 58. The lower bifurcations 65 have alined elongated slightly arcuate slots 67, to receive the oppositely projecting ends of a pin 68, which is entered and held in a hole 69 of the lower arm 59 of member 58. Plate 64 is apertured at 70, to receive a pin 71, projecting from said plate's inner face, and having mounted thereon, for free rotative movement, the sheave 49, which occupies the same vertical plane as the sheave 48.

As best shown in FIG. 6, the central portion of rock shaft 57, between its bearings provided by uprights 51 and 52, has secured thereto a hub or sleeve 72, providing a downward bifurcated extension 73, the latter spanning an enlargement 74 of rectangular cross-section, on the end of a horizontally extending rod 75. Said rod's enlargement 74 is pivotally connected to bifurcated arm 73 by a suitable pin 76, and said rod's other end passes freely through the aforesaid aperture 54 of the transverse web 53 (see FIGS. 3 and 4).

The rod 75 carries a pair of opposed cupped washers 77, 77, one against its enlargement 74 and the other against the web 53. Surrounding rod 75 between said washers is a powerful expansion spring 78, which, in the assembling operation that is completed by insertion of the pin 76, is put under a pre-load of the order of 300–400 pounds. Thus it is that this pre-loaded spring 78, by its thrust against the depending bifurcated arm 73, tends always to turn the rock shaft 57 in a direction (see FIG. 3) that elevates the sheave 48. This of course is counter to the direction of rock shaft turning which a heavily loaded or tensioned cable 22 imposes (see FIG. 4) by its depressant action on the sheave 48, and which further compresses (see FIG. 4) the pre-loaded spring 78.

Figure 5:
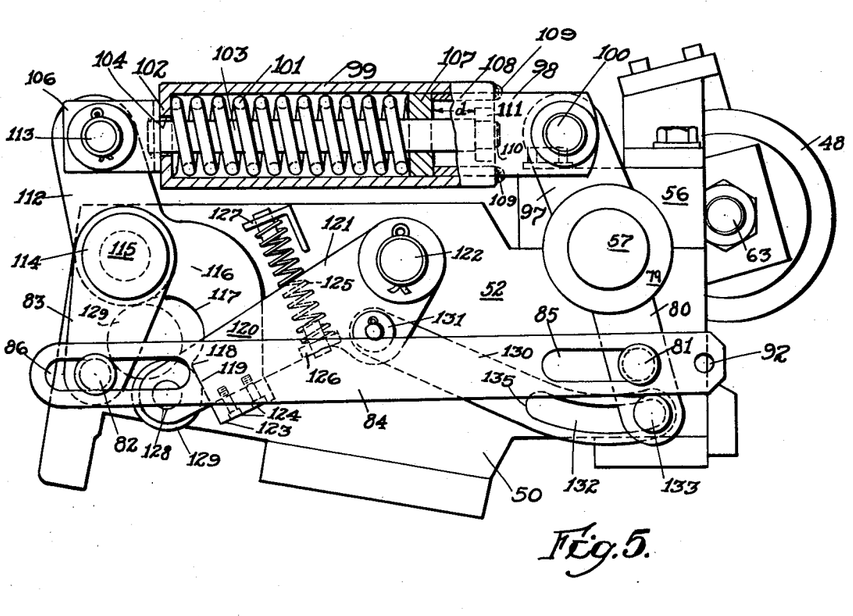

Returning now to FIG. 6, the outer end of rock shaft 57, beyond the outer upright 52, has secured thereto a hub or sleeve 79, providing a downward bifurcated arm or extension 80. The latter's outer bifurcation carries, as best shown in FIGS. 2 and 5, an outwardly projecting headed pin 81 whose reduced shank shows in FIG. 6. A second similar headed pin 82, projects outwardly, near the other end of my control apparatus, from an arm 83 (to be described in detail hereinafter) the head of pin 82 being in the same vertical plane as the head of pin 81. The reduced shank portions of these projecting spaced pins 81 and 82 serve to support, for back and forth sliding movement, an elongated horizontally disposed member 84, by reception of said pins' reduced shanks within the respective elongated slots 85 and 86 at opposite end of said member 84.

This member 84, as hereinafter described, is moved in one direction when cable 22, on pay out from drum 17, threatens to become slack, and in the opposite direction when said cable, on take up by said drum, threatens to become overloaded. These movements are produced by forces of sufficient magnitude to override, in each case, an operator's placement and/or maintenance of hand lever 24 (or 23) in cable pay out or cable take up position (as the case may be) and to forcibly shift the drum control lever 30 into its mid or brake-applying position shown by FIG. 2.

These opposite and overriding movements of member 84 may be transmitted to drum control lever 30 in any suitable way. In FIG. 2 is shown schematically one convenient way of doing so, by making these movements effective on the existing linkage between said control lever 30 and the operator's hand lever 24 (or 23) by which the selective positioning of said control lever is manually effected. This illustrated way involves equipping the tractor 11, forwardly of member 84, with a substantially vertical bell crank lever 87, which is rockable on a horizontal axis provided by a suitable pivot pin 88. The upper arm of bell crank 87 has pivotal connection at 89 with a link or rod 90 whose other end has pivotal connection at 91 with the proximate end of member 84, which for this purpose is suitably apertured, as shown at 92, FIG. 5. The bell crank's lower arm has piovtal connection at 93 with a rod or link 94 whose other end has pivotal connection at 95 with an arm 96 which extends outwardly from the existing linkage's aforesaid vertical shaft 43. This arm 96 may either be welded to said shaft's existing arm 42, or else the latter may be replaced on shaft 43 by a bell crank providing, as shown, these two arms 42 and 96.

As shown in FIGS. 2, 5 and 6, the hub 79, secured to the outer end of rock shaft 57, provides an upwardly extending arm 97. This arm's upper end is spanned by a bifurcated extension 98 integral with the open end of a hollow elongated cylinder 99. A suitable pin 100, passing through alined apertures of arm 97 and bifurcations 98 is adapted to provide a pivotal connection between cylinder 99 and arm 97. Before said pivotal connection is made, the interior of cylinder 99 has assembled therein a powerful expansion spring 101, which bears against said cylinder's opposite closed end 102, and which is put under a heavy preload, of the order of 600-800 pounds. Spring 101 surrounds an elongated rod 103, which passes freely through a central opening 104 of the cylinder's closed end 102, and has its proximate end welded, as shown at 105 to a bifurcated member 106, for a purpose to be hereinafter described.

The preloading of spring 101 may be effected in any suitable way. As herein shown, said spring, whose length in unstressed condition is substantially that of the surrounding cylinder 99, is compressed within said cylinder to the much shorter length shown in FIG. 5, by forcing into said cylinder an annular piston-like member 107, through heavy endwise pressure exerted on a following sleeve-like member 108 which moves into said cylinder's open end. When the desired preload of spring 101, is reached, said member 108 is permanently positioned in cylinder 99 in any suitable way, as by welding 109 securely uniting it with the cylinder's wall.

Within said fixed sleeve 108, the proximate end of rod 103 has secured thereto, as by welding 110, an annular enlargement or abutment 111. The bifurcated member 106, on the other end of rod 103, spans a normally-stationary upstanding arm 112, and is pivotally connected thereto by a suitable pin 113. Rod 103 thus supports, in its illustrated horizontal position, the spring containing cylinder 99, which is adapted to have endwise movement relative to said rod. It is particularly to be noted that with rock shaft arm 97 in the angular position shown by FIG. 5 (before cable load or tension has markedly depressed the sheave 48) the rod's abutment member 111 is spaced an appreciable distance $d$ from the opposed face of the cylinder's contained member 107. Through this distance $d$, the movement, by arm 97, of cylinder 99 is unopposed by the latter's contained heavily-preloaded spring 101. But any cylinder movement in excess of this distance $d$ (from further turning of rock shaft 57 in response to increased cable load) is opposed and resisted, not only by the initial heavy preload of spring 101, but also by the additional compression (see FIG. 4) which said spring undergoes, from further movement of cylinder 99 by arm 97.

The previously-mentioned arms 83 and 112 are important elements of a load-and-fire mechanism, provided on my control unit's outer side for releasing, and putting to work, the powerful forces which are built up, as above described, in the spring 101. Said arms 83 and 112 are provided by a hub member 114 rockably mounted on a stud 115 which projects outwardly from upright 52. Said hub 114 also has a third arm 116, extending laterally and then downwardly therefrom. As best shown in FIG. 5, said arm 116, just below hub 114, has a concave deeply cupped edge surface 117, whose lower end intersects, at a sharp corner or shoulder 118, with a short straight edge surface 119 of arm 116.

The lower portion of arm 116, including said straight edge surface 119, is received between parallel bifurcations 120, 120 of a trigger arm 121 which has pivotal mounting on a stud 122 projecting outwardly from upright 52. One or both of said trigger arm's bifurcations bears against a transverse ledge 123 which is suitably secured, as by bolts 124, 124, to the extreme lower end of arm 116. Said trigger arm 121 is thrust downward, yieldably, to maintain its normal contact with ledge 123, by a spring 125 (shown in FIG. 5, but not in FIG. 2) which is interposed between a crossbar 126 of the trigger arm 121 and a stationary abutment bar 127 secured to and projecting outwardly from the upright 52. The extreme lower ends of the trigger arm's bifurcations 120, 120, beyond the straight edge surface 119 of arm 116, carry a cross pin 128, whereon is journaled between said bifurcations a roller 129. As shown by FIG. 5, the periphery of this roller 129 is engaged directly by the straight edge surface 119 of arm 116. Thus it is that in the normal position of trigger arm 121 shown by FIG. 5, it is impossible for the three-arm system 83, 112, 116 to undergo any turning, clockwise in FIG. 5, on the pivot stud 115, no matter how strong may be the pull in this direction on arm 112 exerted by rod 103, from the further compression of spring 101, as the cable load or tension (see FIG. 4) increases.

As best shown in FIG. 5, my invention provides for a short movement of trigger arm 121, to release its above-described lock on the three-arm system 83, 112, 116, this movement being imparted by means of a thrust link 130. Said link 130 is connected to trigger arm 121 by a pivot pin 131. At its other end, said link 130 provides an elongated arcuate slot 132 through which passes a pin 133 which (see FIG. 6) is mounted and held in registering apertures 134, 134 of the bifurcated downward extension 80 of the outer hub 79 on rock shaft 57. The arrangement is such that as rock shaft 57 is turned (counterclockwise in FIGS. 2 and 4) under increasing cable load tending to lower the sheave 48, the pin 133 will move along through slot 132 with no effect on link 130 until said pin reaches the slot's inner end 135. This is a point at which the cable being reeled in although under relatively heavy load, can still withstand an appreciable increase in load without becoming overloaded. At this point, any further movement of pin 133 from increase of the cable's load, is transmitted through link 130 to trigger arm 121, so as suddenly to destroy the lock imposed by said trigger arm's roller 129 on the arm 116 of the three-arm system 83, 112, 116.

In other words, by a very slight displacement of trigger arm 121—only enough for its roller 129 to move over the shoulder 118 on the edge of arm 116—the three-arm system 83, 112, 116 is suddenly set free to partake of a sharp turning movement (clockwise in FIG. 5, and oppositely in FIG. 2 in response to the very heavy pull of rod 103 on arm 112. This heavy pull comes from the pent-up expansive force of spring 101, as supplied not only by its initial heavy preloading, but also by its further compression or loading (see FIG. 4) as imparted, after take up of the distance d, by further spring-opposed rocking of shaft 57, resulting from the loaded or tensed cable's further depression of sheave 48. The amplitude of this sharp and extremely forcible turning movement of the three-arm lever system 83, 112, 116 is relatively small, being approximately the distance shown in FIG. 5 between the concave or cupped edge surface 117 of arm 116, and the broken line displaced position of the trigger arm's roller 129.

This very forcible relatively short turning movement of the three-arm system 83, 112, 116, in response to any threat of cable overload, occurs, of course, when the operator is maintaining the hand lever 24 (see FIG. 2) in clutch-engaging position. In such position, the member 84, through its described connection with the hand lever's linkage, would have been shifted leftward from its FIG. 2 position, such as to bring the outer end of its slot 86 into close proximity to the pin 82. Thus it is that when such forcible short turning movement occurs, the pin 82 on arm 83 compels the member 84 to move sharply to the right in FIG. 2. This limited rightward movement of member 84, through its illustrated connections with the control lever 30 and hand lever 24, is just sufficient to return both levers to their mid or "neutral" positions shown by FIG. 2, so as to disengage the clutch 28 and apply the brake band 27 to the brake drum 26. In other words, by virtue of the above-described limited amplitude imposed by roller 129 on the turning movement of three-arm lever 83, 112, 116, this rightward clutch-disengaging movement of member 84 is similarly limited, being never any greater than is needed to dispose the levers 24 and 30 in their intermediate brake-applying positions. Thus there can be no excess movement of these levers toward their brake release and cable pay out positions, when the imminence of cable overload produces automatically, as above described, such rightward movement of member 84. It goes without saying that the powerful pent-up expansive force of spring 101 that produces these lever movements, whenever an overload of cable 22 is threatened, is much more than ample in every case to override and overcome any attempt by an operator to hold and maintain the hand lever 24 in clutch-engaging position.

After each triggering, as above described, of the load and fire mechanism of FIG. 5, for automatic discontinuance of cable take up before the threatened cable overload can develop, the operator must take appropriate steps to reset the load and fire mechanism, for further subsequent action, by return of its parts to their normal positions shown by FIG. 5. To effect such resetting, the hand lever 24 (which has been forcibly shifted by such triggering to brake-applying position) needs merely to be shifted momentarily by the operator to its cable pay out position; this action so reduces the taut cable's tension and the expansive force of spring 101 that the other preloaded spring 78 can secure sufficient turning of rock shaft 57 (counterclockwise in FIG. 5) to give leeway, between pin 133 and slot end 135, for the snap back of trigger arm 121 to its illustrated normal locking position, by the expansive force of spring 125.

Figures 3, 7:
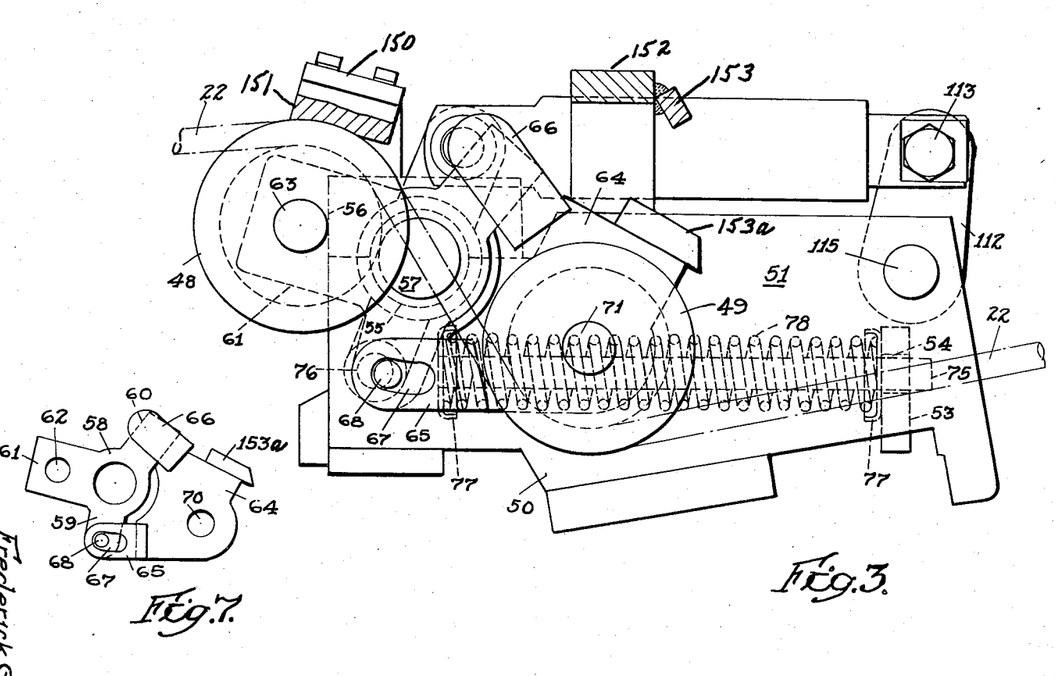
FIG. 3 is a large scale inner side view, partly in section, of my automatic control apparatus, with the parts in "no-load" position.
FIG. 7 is a detached side view, showing in relation to said rock shaft's inner end, the member which carries the other movable sheave.
Figures 4, 8, 9:
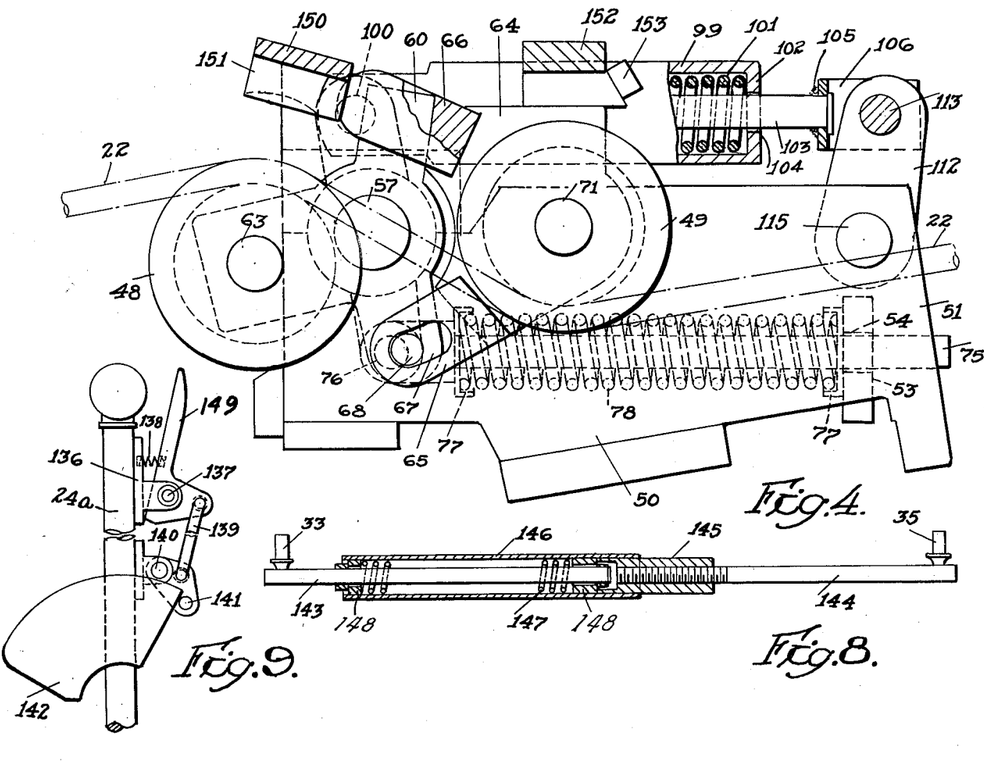
FIGS. 4 and 5 are similar opposite side views, partly in section, of such apparatus, with its parts in different operating positions.
FIG. 8 is a detached side view, partly in section, of an advantageous alternative construction for one of the linkage elements of the existing manually-operated control system shown by FIG. 2.
FIG. 9 is a detached side view of a companion alternative construction for the hand lever shown by FIG. 2.

Another and primary function of the preload spring 78 is to make sure that no slack can ever develop in a cable being payed out from the drum 17. Referring again to FIG. 2, it will be noted that when hand lever 24 is rocked in the direction of arrow B to put drum control lever 30 in cable pay out and brake release position, the member 84 is given such rightward movement as to dispose the outer end of its slot 85 in close proximity to the headed pin 81. Said pin 81 projects outwardly from the bifurcated downwardly extending arm 80 of rock shaft 57. Said rock shaft 57, from the pin connection 76 of its depending arm 73 to the rod 75 of spring 78, is constantly being urged clockwise (FIGS. 2, 3 and 4) by said spring. But except in the "no load" condition shown by FIG. 3, this clockwise turning tendency of shaft 57 is counteracted, in greater or less degree, by the cable load. That is, under very heavy cable load, the cable's depression (see FIG. 4) of sheave 48, gives the rock shaft 57 a counterclockwise turning movement, thereby increasing the compression of spring 78. However, under the much lighter cable loads which prevail on cable pay out, the sheave 48 will be much less depressed than is shown by FIG. 4 from its "no load" (FIG. 3) position.

According to my invention, the various parts and their leverages on rock shaft 57 are so proportioned and related that whenever, on cable pay out, the cable load drops below a predetermined minimum value (of the order for example of 100 to 200 pounds) then this pent-up force of spring 78, by its clear-cut predominance over the diminishing cable load, effects a pronounced clockwise turning movement (as viewed in FIG. 2) of the rock shaft 57. By the pin 81 of said rock shaft's depending arm 80, this rocking movement produces an immediate sharp movement, leftward in FIG. 2, of the member 84, such as to shift both the control lever 30 and the operator's hand lever 24 to their mid or "neutral" positions, for instant application of brake band 27 to the brake drum 26. Thus it is that well before any slack can possibly develop in paying out cable, my apparatus automatically intervenes such as to stop said cable's pay out from the drum, and to hold said cable taut, under the aforesaid predetermined minimum load.

Here again, the spring force that produces this corrective movement of member 84 is more than ample to override any attempt by the operator to keep the hand lever 24 in cable pay out position, because the preload of spring 78 is well in excess of any counter force that an operator can manually exert on the hand lever 24. But in this case of cable slack prevention, there is no need, as in the case of cable overload prevention, to make special provision (see left-hand end of FIG. 5) for limiting the amplitude of the slack preventing corrective movement of the member 84. This is because the cable itself, because of being held taut by the above described brake application under the predetermined minimum tension, serves as a barrier, in the path of sheave 48, to prevent excess or undue clockwise turning of the rock shaft 57 by the expanding spring 78. This so limits the corrective movement, leftward in FIG. 2, of the member 84 that any movement of the control apparatus beyond mid or "neutral" position, in the direction of cable take up position, is effectively prevented.

The preloaded spring 78 also serves to prevent the cable damage and undue cable wear that usually is encountered when a taut and loaded cable momentarily becomes slack, from violent jouncing of the scraper or other implement, when passing over rough terrain. The hazard in this case comes from the tendency of this momentary slackness to be transmitted to the cable's windings on its drum 17, such that outside layers of these windings become disarranged and crossed upon each other—this leading to rapid cable wear. As shown in FIGS. 3 and 4, the inner upright 51 of my control apparatus carries a suitable bracket 150, to whose under surface is attached an arcuate downwardly facing brake shoe 151, positioned directly over the peripheral groove of the sheave 48. Any occurrence of such momentary slackness in a cable to which my invention is applied will create, momentarily, the "no load" condition illustrated in FIG. 3. Therein, by the pent-up expansive force of preloaded spring 78, the sheave 48 is forced upwardly, so as to clamp or pinch the cable 22 between said sheave and the shoe 151, thereby preventing said cable's momentary slackness from working back to the cable windings on drum 17.

In scraper operation, it is sometimes desirable for the hand lever controlling the apron and ejector cable to be releasably locked in its cable pay out position. In FIG. 9 is shown a hand lever 24a which is equipped with a releasable locking means of ordinary construction. For this purpose, said hand lever's shank has suitably secured thereto a bracket 136 to which is pivoted at 137 a bell crank member 149. A light spring 138 thrusts outwardly against member 149, to maintain yieldably the illustrated locked condition of hand lever 24a in cable pay out position. To obtain this releasable locking, the bell crank member 149 has a pivoted link connection 139 with a suitable arm, pivoted at 140 to bracket 136; said pivoted arm carries a projecting locking pin 141 that, in the unlocked condition of hand lever 24a, is adapted to ride on the upper arcuate edge of a stationary quadrant plate 142, mounted in adjacent relation to said hand lever. FIG. 9 shows the cable pay out position of hand lever 24a, in which the locking pin 141, having reached the end of the quadrant plate's curved upper edge, has dropped into locking position. By finger pressure on member 149, the operator can raise the locking pin 141 back onto quadrant plate 142 for counterclockwise rocking of hand lever 24a toward its "neutral" or brake-applying position.

My invention is readily adaptable to use of such a hand lever 24a, merely by substituting, for the existing solid link connection 34 of FIG. 2, an extensible link connection of the construction shown by FIG. 8. As therein shown, the pivotal connections 33 and 35 of FIG. 2 are made with the outer ends of a pair of alined normally abutting rods 143 and 144 respectively, the latter having adjustably threaded on its inner end a member 145 to which is secured an elongated sleeve 146. Said sleeve 146 surrounds not only the other rod 143, but also an elongated rod encircling spring 147, which is confined between opposite end abutments 148, 148, one on the sleeve 146 and the other on the rod 143. Thus it is that with hand lever 24a locked in cable pay out position, the above described left-hand corrective movement of member 84, whenever cable slack threatens to develop, can still effect the desired shift of control lever 30 to its mid or brake-applying position, since the link construction of FIG. 8 will enlongate in sufficient amount for this to occur.

The construction and operation of my invention, as well as most of its advantages, will be readily understood from the foregoing detailed description thereof. A further important advantage stems from the fact that the tension responsive sheaves 48 and 49, which engage from opposite sides with the cable's live or active reach, will move in unison only initially; that is, the upward movement of sheave 49, under increasing cable load or tension, is abruptly terminated when a projection 153a on its carrier plate 64 strikes a fixed stop 152 on the upright 51. Said stop 152, as shown in FIG. 3, preferably has welded thereto an end member 153, for engaging the end of projection 153a, so as to stabilize the sheave 49 in its elevated position. From this point on, increases in cable load or tension produce movement only of the sheave 48, whose relatively-short leverage, with respect to rock shaft 57, is conducive to the attainment of much greater accuracy and sensitivity, in the above-described actions of the preloaded springs 78 and 101, and of the load-and-fire mechanism shown in FIG. 5.

I claim:

1. In a power operated cable system of the class wherein a cable winding drum is equipped with a selective 3-position manually-operated control, the latter having a middle neutral or unclutched position at which a brake is applied to said drum, a cable pay out position, on one side of neutral, at which said brake is released, and a cable take up position on the other side of neutral at which said brake is released and a clutch is engaged to rotate said drum from a power source, the combination with said devices and their manually-operated control, of means responsive in the cable take up position of said control to cable tension in excess of a predetermined maximum value for shifting said control to neutral, such as to disengage said clutch and to apply said brake to said drum, said excess tension responsive means including a preloaded spring means whose force, as released by said excess cable tension, is of sufficient magnitude to override an operator's maintenance of said manual control in its cable take up position.

2. Control apparatus as defined in claim 1, including means incorporated in said excess tension responsive means for limiting the amplitude of the shifting movement imparted thereby to said manual control, such as to stop the latter, at each operation of said excess tension responsive means, in its middle or neutral position.

3. Control apparatus as defined in claim 1, in which the excess tension responsive means includes a pair of independently movable spaced apart sheaves, engaging from opposite sides with a live reach of said cable, and means for exerting one sheave's movement, from increasing cable tension, to additional loading of said preloaded spring means.

4. Control apparatus as defined in claim 3, in which the excess tension responsive means includes a load and fire mechanism, triggered by increase of cable load or tension to said predetermined maximum value, for releasing said preloaded spring means in a direction to shift said manual control from its cable take up position to its intermediate or neutral position, for disengaging said clutch and for applying said brake to said drum.

5. Control apparatus as defined in claim 4, including means rendered operative by the triggering of said load and fire mechanism for limiting the amplitude of said control's shifting movement by said spring means, such as to prevent said control from moving beyond its neutral position toward its cable pay out position.

6. Control apparatus as defined in claim 4, including means for holding said load and fire mechanism inoperative until the cable load or tension reaches said predetermined maximum value.

7. In a power operated cable system of the class wherein a cable winding drum is equipped with a selective 3-position manually-operated control, the latter having a middle neutral or unclutched position at which a brake is applied to said drum, a cable pay out position, on one side of neutral, at which said brake is released, and a cable take up position on the other side of neutral, at which said brake is released and a clutch is engaged to rotate said drum from a power source, the combination with said devices and their manually-operated control, of means responsive in said control's pay out position to cable tension drop below a predetermined minimum value for shifting said control to neutral, such as to apply said brake to said drum, said minimum tension responsive means including a preloaded spring means whose force, in effecting the application of said brake to said drum, is of sufficient magnitude to override an operator's maintenance of said manual control in its cable pay out position.

8. Control apparatus as claimed in claim 7, including a hand lever, and an extensible link connecting said hand lever with said control, whereby said hand lever may be locked in cable pay out position without affecting the brake applying action of said minimum tension responsive means.

9. In a power operated cable system of the class wherein a cable winding drum is equipped with a selective 3-position manually operated control, the latter having a middle neutral or unclutched position at which a brake is applied to said drum, a cable pay out position on one side of neutral at which said brake is released, and a cable take up position on the other side of neutral at which said brake is released and a clutch is engaged to rotate said drum from a power source, the combination with said devices and their manually operated control, of means responsive to predetermined high and low extremes of cable tension for shifting said control to neutral position, in one direction from said take up position when the cable tension exceeds a predetermined maximum value, and in the other direction from said pay out position when the cable tension drops below a predetermined minimum value, said tension responsive means including a first preloaded spring means which is additionally loaded and subsequently fired by increasing cable tension, for shifting said manual control from cable take up position to its middle or neutral position, and a second preloaded spring means for shifting said manual control from its cable pay out position to its middle or neutral position.

10. Control apparatus as claimed in claim 9, in which the spring forces applied by said respective preloaded spring means are of sufficient magnitude to override an operator's maintenance of said manual control in its respective cable take up and cable pay out positions.

11. Control apparatus as claimed in claim 9, including a member moved in opposite directions by said respective preloaded spring means, and connections from said member to said manual control.

12. Control apparatus as claimed in claim 9, including means for applying said second preloaded spring means to the resetting of said first preloaded spring means, after each firing of the latter.

13. Control apparatus as claimed in claim 9, including a movably mounted sheave maintained by said second preloaded spring means against a live reach of the cable, and an opposing stationary element, such that when momentary slack develops in a normally taut and loaded cable, said reach is clamped between said sheave and said element to prevent the slack from reaching the cable convolutions on said drum.

14. Control apparatus as claimed in claim 9, including means for limiting the amplitude of said control's shifting movement by said first preloaded spring means, such as to prevent said control from moving beyond its neutral position toward its cable pay out position.

15. Control apparatus as claimed in claim 14, in which the limiting means is moved to operative position by the firing of said first preloaded spring means.

16. Control apparatus as claimed in claim 9, in which the means responsive to predetermined extremes of cable tension includes a pair of adjacent independently movable sheaves, engaging from opposite sides with a live reach of said cable, and means for exerting one sheave's movement, from increasing cable tension, to additional loading of both of said preloaded spring means.

17. Automatic control apparatus for operative association with a power operated cable system whose cable winding drum has a selective 3-position manually operated control, the latter providing a middle neutral or unclutched position at which a brake is applied to said drum, a cable pay out position on one side of neutral at which said brake is released, and a cable take up position on the other side of neutral at which said brake is released and a clutch is engaged to rotate said drum from a source of power, said automatic control apparatus comprising a first loaded spring, released in said manual control's take up position by rise of cable tension above a predetermined maximum value, for moving said manual control toward its other two positions, a second loaded spring responsive in said manual control's pay out position to fall of cable tension below a predetermined minimum value for moving said manual control toward its other two positions, and means for stopping said manual control, on each movement thereof by said respective first and second springs, at its middle neutral position, for applying said brake to said drum, whereby the cable, on take up before any overload develops, and on pay out before any slack develops, is stopped and held taut by said braked drum.

18. Automatic control apparatus as claimed in claim 17, including a mechanism loaded and fired by increasing cable tension for triggering the release of said first loaded spring.

19. Automatic control apparatus as claimed in claim 18, in which said triggering mechanism includes a stop for limiting the amplitude of the manual control's movement by said first loaded spring, such as to prevent said control's movement beyond its middle neutral position.

20. Automatic control mechanism as claimed in claim 17, in which the stoppage of said manual control in its middle neutral position, when moved by said second loaded spring, is by the cable itself, when stopped and held taut by the braked drum.

References Cited in the file of this patent

UNITED STATES PATENTS

| | | |
|---|---|---|
| 385,754 | Graves | July 10, 1888 |
| 417,274 | Parsons | Dec. 17, 1889 |
| 2,117,078 | Brauer | May 10, 1938 |
| 2,445,228 | Le Tourneau | July 13, 1948 |
| 2,462,972 | Johnson | Mar. 1, 1949 |
| 2,573,997 | Souza | Nov. 6, 1951 |
| 2,596,203 | Bridwell | May 13, 1952 |